April 2, 1968     O. M. HAWKINS     3,375,656

GAS GENERATOR CARTRIDGE

Filed July 1, 1966     2 Sheets-Sheet 1

Oscar M. Hawkins INVENTOR.

BY

ATTORNEY

April 2, 1968  O. M. HAWKINS  3,375,656

GAS GENERATOR CARTRIDGE

Filed July 1, 1966  2 Sheets-Sheet 2

Oscar M. Hawkins INVENTOR.

BY Rolf Williams

ATTORNEY

United States Patent Office 3,375,656
Patented Apr. 2, 1968

3,375,656
GAS GENERATOR CARTRIDGE
Oscar M. Hawkins, Huntsville, Ala., assignor to Thiokol Chemical Corporation, Bristol, Pa., a corporation of Delaware
Filed July 1, 1966, Ser. No. 562,351
4 Claims. (Cl. 60—39.47)

ABSTRACT OF THE DISCLOSURE

A turbo jet gas generator starter cartridge, for use with the breech mechanism for a turbo jet starter turbine, including a container, having a piston provided with a throat mounted therein, a membrane disc for sealing the throat, a solid propellant in the container aft of the piston, an ignition means for the solid propellant, a gasket sealing the piston and breech mechanism so that when the solid propellant is ignited and the combustion gases created by such ignition has ruptured the membrane disc in the throat of the piston, the sealing gasket will prevent leakage of the combustion gases outwardly of the breech mechanism.

---

This invention relates to improvements in starting devices for turbo jet engines and more particularly it relates to gas generator cartridges that are utilized for starting the gas driven turbo jet starter turbine.

One of the important features of a gas generator cartridge is that it include a cheap inexpensive disposable container that must be capable of delivering a constant flow of gas to the turbo jet starter turbine and at the same time possesses the capability of sealing the breech mechanism of the turbo jet starter turbine into which the cartridge is inserted against leakage of smoke and hot gases that are produced by the ignition of the cartridge.

More particularly the cartridge embodying the instant invention is provided with sealing means that provide a perfect gas seal for the breech mechanism to prevent any escape of the internal pressure that is created in the cartridge and is necessary to effectively start the turbo jet starter turbine.

A solid propellant is utilized in the cartridge and it is important that the container of the cartridge protect the solid propellant under many temperature ranges.

One of the requirements of the United States Air Force is the ability to have jet aircraft on instant readiness for an alert. To place such aircraft on alert requires a cartridge that will perform its functions under adverse, as well as compatible weather conditions.

The cartridge embodying the instant invention, has been tested under a broad range of temperature changes and it has been determined that the cartridge will stand up under hard usage and adverse weather conditions.

An object of the invention is, therefore, to provide a cartridge that will operate efficiently in turbo jet starter turbines.

It is another object of the invention to provide an inexpensive disposable container for the cartridge that will protect the components that are assembled therein from minor damage and adverse weather conditions.

It is a further object of the invention to provide a cartridge that is fully protected against gas leakage and smoke.

With the above and other objects and advantages in view, it is believed that still others will become apparent during the course of the detailed description of the invention when considered with the accompanying drawings in which.

Figure 1:
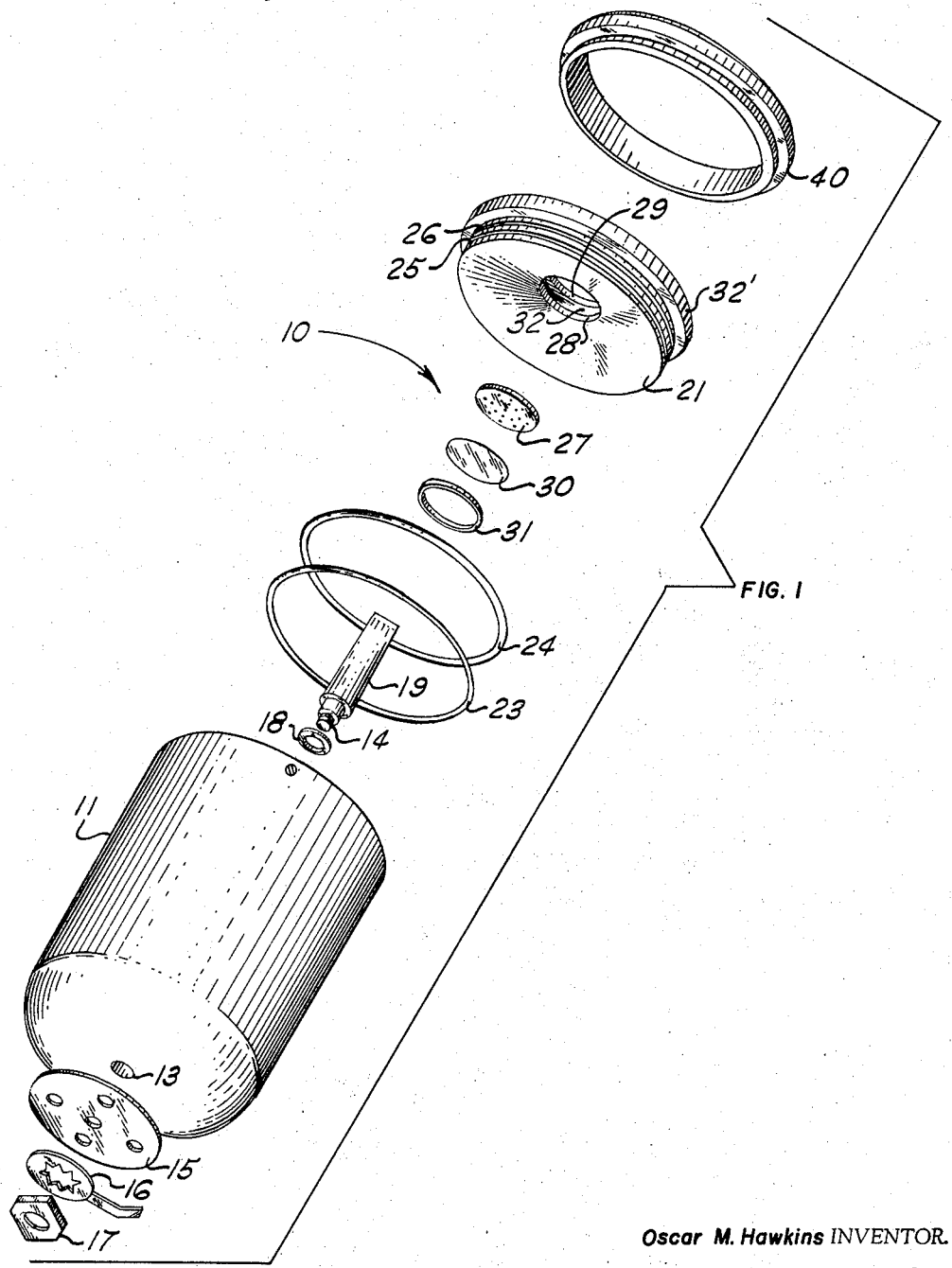
FIGURE 1 is an exploded perspective view of a cartridge embodying the invention.

Referring more in detail to the drawings, wherein like parts are designated by like reference numerals, the reference numeral 10 is used to designate the starter cartridge embodying the invention which includes all of the component parts, as illustrated in FIGURE 1.

Figures 2, 3:
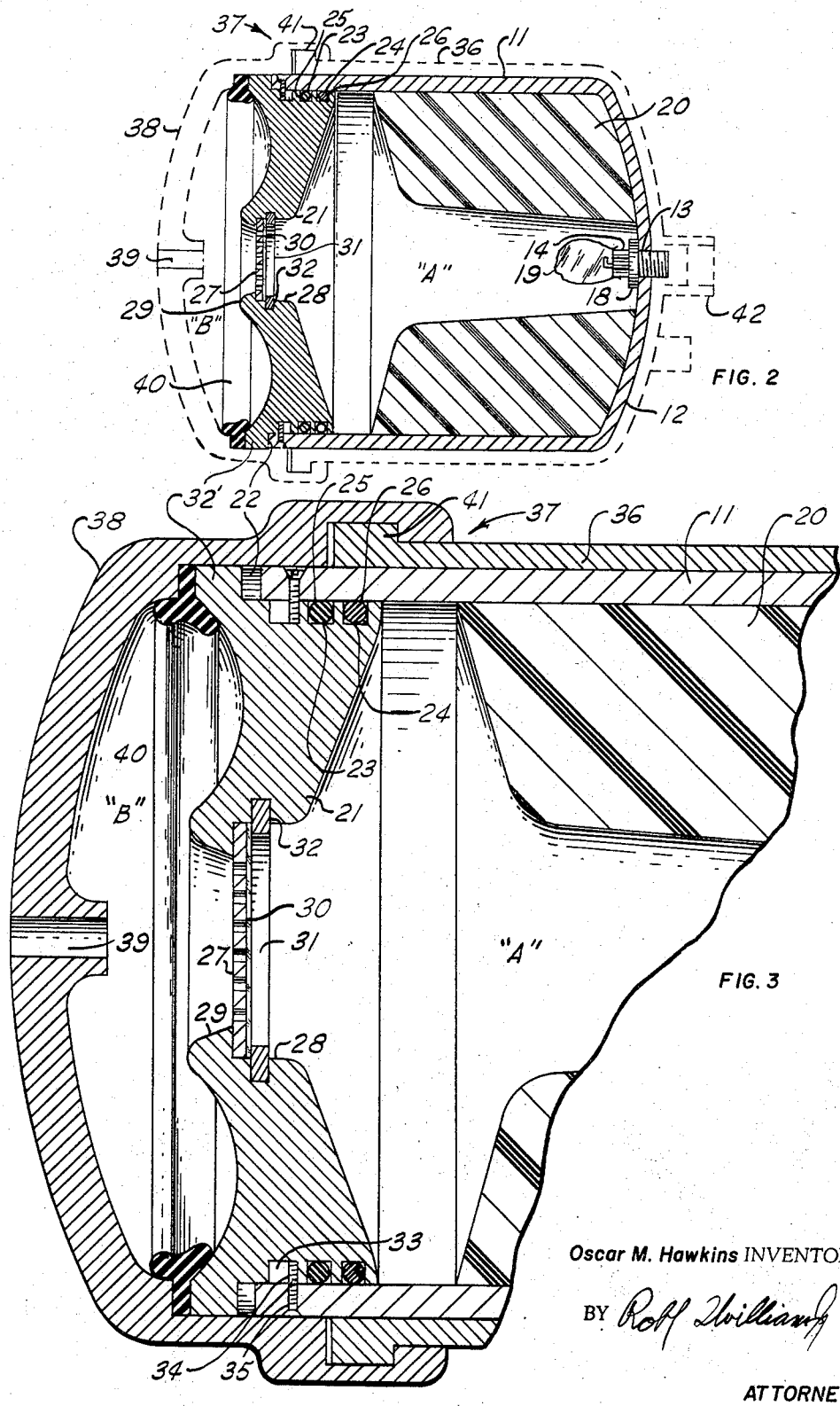
FIGURE 2 is an enlarged longitudinal sectional view of the cartridge as it will be inserted into the breech mechanism, shown in dotted lines of a turbo jet starter turbine.
FIGURE 3 is a further enlarged fragmentary sectional view of the cartridge and breech, showing the manner of sealing the cartridge within the breech mechanism.

The starter cartridge 10 includes a compression molded plastic cup-shaped container 11 which is provided with a rounded closed bottom 12 having a medical opening 13 therein. The opening 13 is provided in the bottom 12 to receive an igniter 14 that, extending outwardly of the opening 13, receives thereon an impact washer 15, a shorting clip 16 and finally a retainer nut 17 that immobilizes the igniter 14 in relation to the container 11. A washer 18 is positioned on the igniter 14. Mounted on the igniter 14 inwardly of the container 11 is a heat sealed plastic bag 19 in which is placed a pyrotechnic material that will be ignited by the igniter 14 when an electrical impulse has been generated therein and the pyrotechnic material will in turn ignite a solid propellant grain 20 which has been positioned in that portion of the container 11 that provides a combustion chamber A, as shown in FIGURE 2.

A piston or end cap 21 is then to be inserted into the open end 22 of the container 11 but before the insertion thereof a pair of O-ring glands 23 and 24 are positioned in a pair of annual grooves 25 and 26 in the peripheral edge of the piston 21. Next a circular disc-shaped screen 27 is inserted into a circular recess 28 that is directly inwardly of a throat 29 formed in the medial portion of the piston 21. Then a circular membrane disc 30 of mylar film is inserted into the recess 28 until it is in positive contact with the screen 27 and lastly a retainer spring clip 31 is positioned in an annular groove 32 that is contiguous with the circular recess 28 and the spring clip 31 immobilizes the screen 27 and the disc 30 in the circular recess 28 in the piston 21 immediately inwardly of the throat 29 thereof.

The piston 21 is inserted into the open end 22 of the container 11 until an annular peripheral flange 32′ thereon engages the peripheral edge of the container 11 that defines the open end 22 thereof. Since the piston 21 is free floating within the container 11, some means must be provided to prevent the piston 21 from sliding outwardly of the container 11, in this instance, a plurality of elongated slots 33 are provided in the periphery of the piston 21 and set screws 34 mounted in threaded countersunk openings 35 in the container 11, extend into the slots 33 to prevent the piston 21 from sliding outwardly of the container 11. The slots 33, however, are of a sufficient length to permit free movement of the piston 21 to perform the sealing action that is required of the cartridge 10.

The starter cartridge 10 is now operational and is ready to be inserted into the removable cup-shaped portion 36 of the breech mechanism 37. The closure cap 38 of the breech mechanism 37 is secured to the turbo jet so that a medial port 39 therein has direct communication with the turbo jet starter turbine. The cup-shaped portion 36 of the breech mechanism 37 is now ready to be inserted into the closure cap 38 and just prior to its insertion a T-shaped hi temp. silicone gasket 40 is positioned on the piston 21 of the starter cartridge 10 so that it is contiguous with and in contact with the outer surface of the flange 32′ on the piston 21, thus, as the closure cap 38 is secured to the cup-shaped portion 36 of the breech mechanism 37 by a conventional bayonet joint 41, the gasket 40 provides a gas seal between the closure cap 38 and flange 32' on the piston 21. Thus a second chamber B which is a pressure chamber is formed by the piston 21 and closure cup 38 of the breech mechanism 37. It is also to be noted that the cup-shaped portion 36 of the breech mechanism 37 is provided with a flanged opening 42 whereby a lead from a conventional electrical source (not shown) is inserted to be connected to the igniter 14 in the cartridge 10.

As illustrated, the breech mechanism 37 serves to house the starter cartridge 10, provide a pressure chamber B for containing the gases generated by the cartridge 10 in the combustion chamber A and deliver these gases under pressure through the port 39 to the turbo jet starter turbine. There must also be complete sealing of all joints between the breech mechanism 37 and the starter cartridge 10 to prevent escape of the pressured gases and any smoke created thereby.

To properly seal the breech mechanism 37, the chamber A in the cartridge 10 must have a higher internal pressure than that in chamber B. To accomplish this the disc 30 will prevent instant discharge of the gases from the chamber A until the piston 21 is urged forwardly to compress the gasket 40 and completely seal chamber B, as shown in FIGURE 4, at which time the disc 30 will be ruptured and the gases in chamber A will pass outwardly thereof through the throat 29 in the piston 21 into the chamber B. As the gases pass outwardly of the chamber B to the turbo jet starter turbine, the same will be actuated to start the turbo jet engine. The screen 27 prevents any debris caused by the rupture of the disc 30 or the burning of the solid propellant grain 20 from passing outwardly of the chamber A into the chamber B. Since the internal pressure created in the chamber A will always be greater than the internal pressure existing in chamber B, the gasket 40 will maintain the breech mechanism 37 sealed until the cartridge 10 is exhausted and the turbo jet engine has started.

From the foregoing description it is believed that one skilled in the art would be cognizant of the manner of operation and construction of the invention and it is also believed that variations in the construction and operation thereof could be adhered to provided such variations wall within the spirit of the invention and the scope of the appended claims.

Having thus described the invention what is claimed as new and desired to be secured by Letters Patent is:

1. A turbo jet gas generator starter device comprising a breech mechanism for attachment to a turbo jet starter turbine, said breech mechanism including a removable cup-shaped portion having a closure cap thereon adapted to be secured to the turbo jet starter turbine, an open ended cup-shaped container positioned in the cup-shaped portion of the breech mechanism, forming a combustion chamber and having a solid propellant grain positioned therein, a piston having sealing means thereon positioned in said container in contact with the open end thereof and confronting said solid propellant grain, said piston having a throat therein, means positioned in said throat for temporarily sealing said throat and said combustion chamber, ignition means inserted into said container for igniting said solid propellant grain, sealing means positioned intermediate of the closure cap for said mechanism and said piston, whereby when said container is positioned in said breech mechanism, said last said sealing means will prevent leakage of combustion gases outwardly of said breech mechanism, when said propellant grain has been ignited by said ignition means and ruptured said sealing means in said throat of said piston.

2. A turbo jet gas generator device as in claim 1, wherein said piston is provided with an annular peripheral flange that engages the open end of said container, a pair of annularly spaced grooves in the periphery of said piston and a pair of O-ring glands are positioned in said grooves for the sealing of said piston within said container.

3. A turbo jet gas generator device as in claim 1, wherein the sealing means for the throat of said piston includes a circular disc-shaped screen, a circular membrane disc and a spring clip for immobolizing said screen and said membrane disc in said piston.

4. A turbo jet gas generator device as in claim 1, wherein the sealing means positioned intermediate of the closure cap for said mechanism and said piston comprises a compressible T-shaped gasket.

References Cited

UNITED STATES PATENTS

| | | |
|---|---|---|
| 2,498,080 | 2/1950 | Jasse. |
| 2,876,620 | 3/1959 | Weinland et al. _____ 60—255 |
| 2,939,365 | 6/1960 | Vaiden _____ 102—39 XR |
| 2,942,547 | 6/1960 | Rabern et al. _____ 60—256 XR |
| 2,979,896 | 4/1961 | Perkins et al. _____ 102—39 |
| 3,024,592 | 3/1962 | Leaman _____ 60—39.47 XR |
| 3,039,718 | 6/1962 | Bohr _____ 60—253 XR |
| 3,270,668 | 9/1966 | Silver _____ 60—256 XR |
| 3,301,785 | 1/1967 | Ratliff et al. _____ 60—255 XR |

CARLTON R. CROYLE, *Primary Examiner.*